(12) United States Patent
Bahrami et al.

(10) Patent No.: US 8,903,848 B1
(45) Date of Patent: Dec. 2, 2014

(54) METHODS AND SYSTEMS FOR CONTEXT-AWARE ENTITY CORRESPONDENCE AND MERGING

(75) Inventors: Ali Bahrami, Sammamish, WA (US); Jun Yuan, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 13/082,121

(22) Filed: Apr. 7, 2011

(51) Int. Cl.
*G06F 17/30* (2006.01)

(52) U.S. Cl.
CPC ............................... *G06F 17/30424* (2013.01)
USPC ........... 707/769; 707/706; 707/713; 707/722; 707/736; 707/739; 707/758; 707/759; 707/781; 707/804; 455/456.2

(58) Field of Classification Search
USPC ......... 707/706, 713, 722, 736, 739, 758, 759, 707/769, 781, 804, 999.002–6; 455/456.2
See application file for complete search history.

(56) References Cited

U.S. PATENT DOCUMENTS

| | | | |
|---|---|---|---|
| 7,062,507 | B2 | 6/2006 | Wang et al. |
| 2004/0078777 | A1 | 4/2004 | Bahrami |
| 2004/0167864 | A1 | 8/2004 | Wang et al. |
| 2004/0267730 | A1 | 12/2004 | Dumais et al. |
| 2005/0204333 | A1 | 9/2005 | Denby et al. |
| 2006/0288330 | A1 | 12/2006 | Bahrami et al. |
| 2007/0022107 | A1 | 1/2007 | Yuan et al. |
| 2007/0100790 | A1 | 5/2007 | Cheyer et al. |
| 2008/0034055 | A1 | 2/2008 | Das et al. |
| 2008/0313162 | A1 | 12/2008 | Bahrami et al. |
| 2009/0299990 | A1* | 12/2009 | Setlur et al. .................. 707/5 |
| 2011/0106807 | A1* | 5/2011 | Srihari et al. ............... 707/739 |

OTHER PUBLICATIONS

ACM Digital Library Search Results for ontology and retrieval and aggregation and query; http://portal.acm.org; Feb. 24, 2011; 5 pages.
Google Patents Search Results for ontology retrieval aggregation query; http://www.google/com/patents; Feb. 24, 2011; 2 pages.
Google Scholar Search Results for ontology retrieval aggregation query; http://scholar.google.com; Feb. 24, 2011; 2 pages.
IEEE Xplore Search Results for ontology retrieval aggregation query; http://ieeexplore.ieee.org/search; Feb. 24, 2011; 2 pages.
Patents Search Results; https://priorartdatabase.com; Feb. 24, 2011; 2 pages.
Sarma, A. et al; Representing Uncertain Data: Models, Properties, and Algorithms; VLDB Journal; Jan. 2009; 31 pages.
Gyongyi, Z. et al.; Link Spam Detection Based on Mass Estimation; First International Workshop on Clean Databases; VLDB '06; Sep. 12-15, 2006; Seoul, Korea; 12 pages.

(Continued)

*Primary Examiner* — Syling Yen
(74) *Attorney, Agent, or Firm* — Armstrong Teasdale LLP

(57) ABSTRACT

A computer-based method for correlating relevant information from multiple entities based on contextual correspondence is described. The method includes receiving, at a computer, information relating to a plurality of the multiple entities, the information including data features and context features, correlating the data features utilizing one or more algorithms running on the computer, correlating the context features utilizing one or more algorithms running on the computer, and aggregating the plurality of the multiple entities based on both a correspondence of the data features and a correspondence of the context features for at least one of storage in a memory associated with the computer and output as data from the computer.

17 Claims, 5 Drawing Sheets

(56) References Cited

OTHER PUBLICATIONS

Whang, S. et al.; Generic Entity Resolution with Negative Rules; VLDB Journal; Feb. 2009; 17 pages.

Whang, S. et al; Flexrecs: Expressing and Combining Flexible Recommendations; SIGMOD; Aug. 2009; Providence, RI; 12 pages.

Menestrina, D. et al; Evaluating Entity Resolution Results; Proceedings of VLDB Endowment; vol. 3, No. 1; Sep. 2009; Singapore; 12 pages.

* cited by examiner

METHODS AND SYSTEMS FOR CONTEXT-AWARE ENTITY CORRESPONDENCE AND MERGING

BACKGROUND

The field of the disclosure relates generally to context aware information collection and aggregation in a dynamically changing and distributed environment, where information is needed by different information consumers for different purposes. Specifically, the disclosure is directed to methods and systems for context-aware entity correspondence and merging.

Existing information aggregations are static and current approaches don't address dynamic information aggregation. In contrast, context is any information used in realization of the meaning of an entity and any information used to characterize the situation of an entity. Examples of context information may include: location, identity, time and activity. Context answers fundamental questions such as what is occurring in the situation, where you are, who you are with, and what objects are around. Additionally, context refers to the current values of specific ingredients that represent a user's activity/situation.

Entity resolution (ER) approaches do not analyze the context features. Specifically, a disambiguation quality associated with ER approaches frequently depends on the context in which they are employed. Another application of the proposed approach is that if the context can be captured then this knowledge can be utilized to significantly improve performance of an ER ensemble.

BRIEF DESCRIPTION

In one aspect, a computer-based method for correlating relevant information from multiple entities based on contextual correspondence is provided. The method includes receiving, at a computer, information relating to a plurality of the multiple entities, the information including data features and context features, correlating the data features utilizing one or more algorithms running on the computer, correlating the context features utilizing one or more algorithms running on the computer, and aggregating the plurality of the multiple entities based on both a correspondence of the data features and a correspondence of the context features for at least one of storage in a memory associated with the computer and output as data from the computer.

In another aspect, one or more computer-readable storage media having computer-executable instructions embodied thereon are provided, wherein when executed by at least one processor, the computer-executable instructions cause the at least one processor to receive information relating to a plurality of the entities, the information including data features and context features, separately correlate the data features and the context features and aggregate the plurality of entities based on both a correspondence of the data features and a correspondence of the context features.

In still another aspect, a context aware information collection and aggregation method is provided that includes defining an entity, generating a context data structure, the context data structure corresponding to a predefined context definition, receiving context data based on a context definition including one or more data types and one or more parameters for each data type based on entity properties, entity positions and entity types, formatting data for an entity separately from the context data, and outputting a result based on the context data and said entity data according to a set of entity criteria.

The features, functions, and advantages that have been discussed can be achieved independently in various embodiments or may be combined in yet other embodiments further details of which can be seen with reference to the following description and drawings.

DETAILED DESCRIPTION

A number of inter-related technical challenges are addressed herein, ranging from issues associated with context modeling and representation, context acquisition and inference, contextual correspondence identification, and handling context incompleteness/uncertainty, to understanding the role/impact on "organic" cognitive processes and assessing the efficacy of context-aware entity correspondence and merge. The described embodiments provide a modular, flexible, extensible context meta-model to represent, correlate, and transform context data among different models and data instances, methods to dynamically link, group, aggregate, and merge contextually relevant information artifacts, semantic meaning extraction, contextual correlation derivation, and predict information needs based on context changes, and processing of contextual events.

The described embodiments address the problems related to the correlation of relevant information from multiple sources based on the contextual correspondence of multiple information entities. The embodiments further address the linking and/or merging of these multiple information entities together to better meet the total information needs of users in specific situations.

Drawing on the definition of context provided above, context-awareness is an ability of a system to sense, interpret, and react to changes in the environment in which a user is situated. For example, a particular information entity co-exists together with other information entities in a given information space. Given the particular information entity, its contextual background usually shapes the meaning and the value of the particular information entity, as well as any correlations the particular information entity may share with the other information entities. In order to manage information along with its meanings, values, and correlations with other entities, an appropriate contextual environment of an information entity is characterized in some manner. The embodiments relating to context-aware entity correspondence and merging (CECM) represent information entities by their data and context features, which are referred to as context-based entities (CE).

Figure 1:
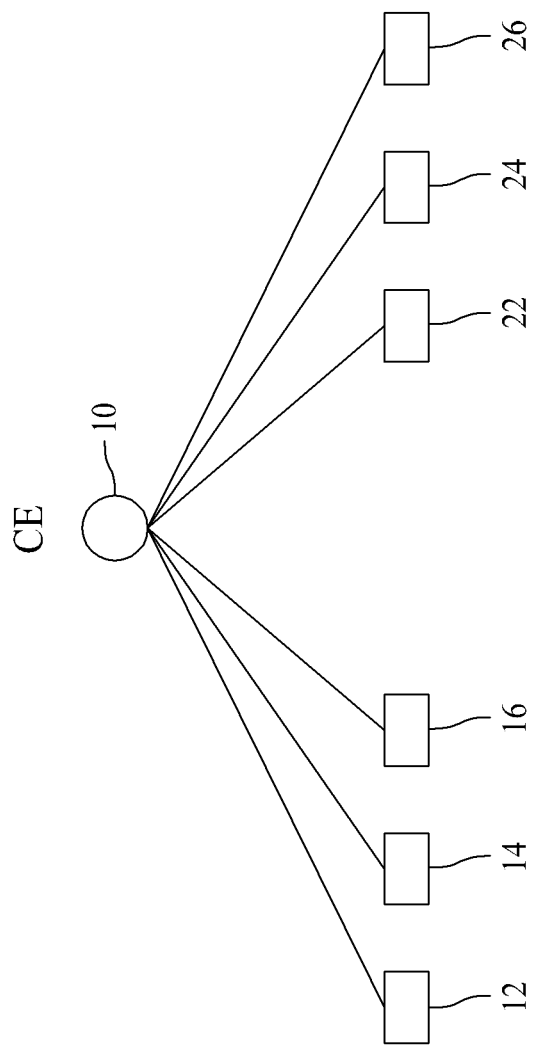
FIG. 1 is a depiction of a context-based entity which is represented by entry data features and entry context features.

In order to manage information it must be characterized in some manner. Entity context characterizes an entity, and entity is represented by two types of entity features data and context. Such entity characterizations include, but are not limited to, entity identity, entity type, time, location and activity. As implied in the preceding sentence, other types of context may be included. Entity context features are dynamic and assumed to be constantly changing and therefore may not be persistently stored in a database. However, without losing any generality, and for simplicity, it is assumed entity context features are stored in a persistent data repository, as represented in FIG. 1. Referring specifically to FIG. 1, a context-based entity 10 is represented by entry data features 12, 14, and 16 and entry context features 22, 24, and 26.

A CECM solution correlates and aggregates multiple context-based entities based on their contextual correspondence, and therefore extends the one-dimensional (data feature only) information representation to a multi-dimensional (with various context features) information representation. As a result, a CECM solution will provide more options for decision makers to reduce information overload by filtering more relevant, precise, and ready to consume information from a large information space, tailored by, for example, an area of operation, a commander, a time period, and a given mission, each of which represents a specific context feature of the original information entity.

Context-aware Entity Correspondence (CAC). Built on top of the described context modeling and reasoning capabilities, CAC dynamically links, groups, aggregates, and merges contextually relevant information. CAC also calculates contextual relationships, and composes new information artifacts that merge multiple existing artifacts together.

Context-aware entity correspondence is concerned with the association of individual entities based on entity context and context model or ontology. The relationships among entities are influenced by their contexts. Relationships among context-based entities can be dynamically established by their shared common context.

Figure 2:
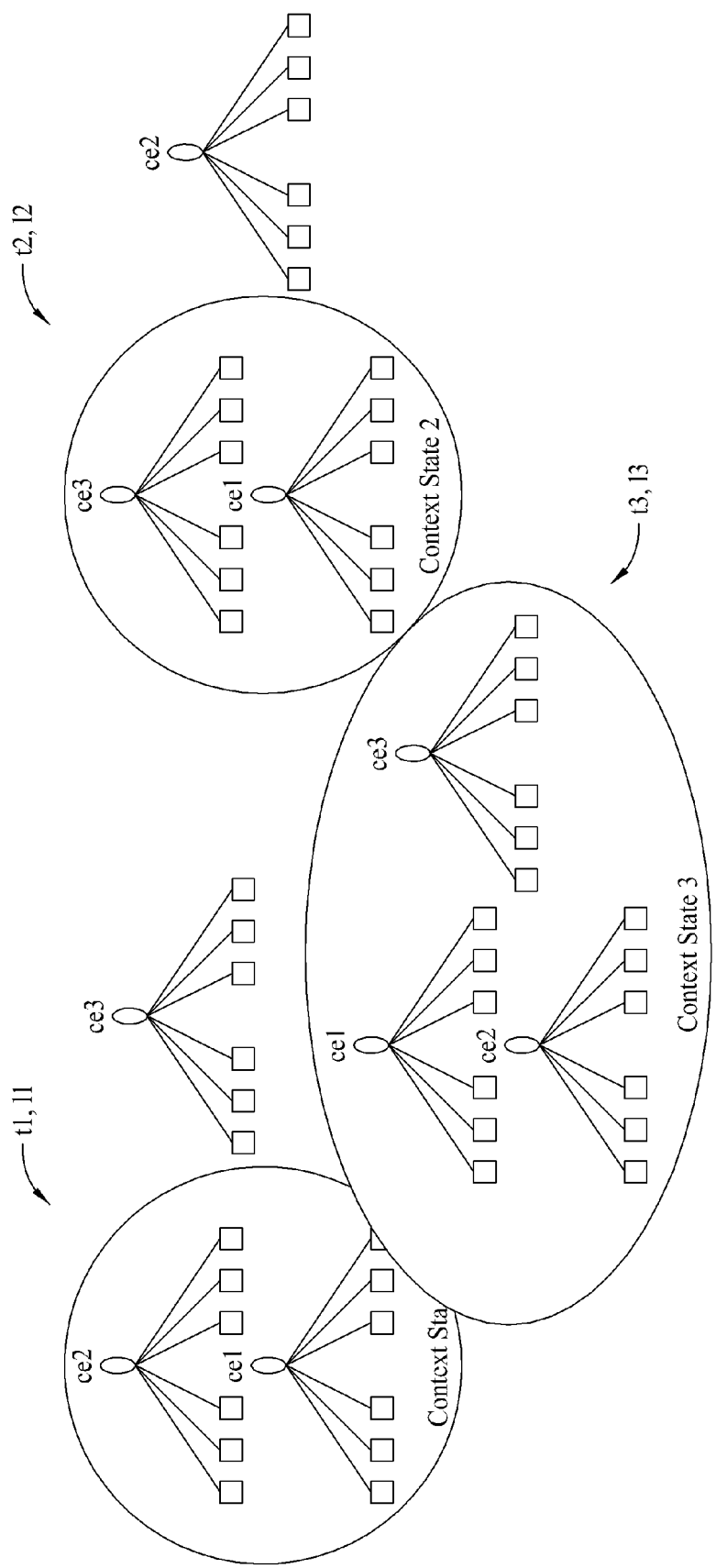
FIG. 2 is a representation of depictions of three context-based entities and grouping of the entities at different times and locations, based on context.

In CECM, the entities' correspondence is represented by a numerical strength indicative of context features compatibility between entities. FIG. 2 includes depictions of three context-based entities ce1, ce2, and ce3. At time t1, location l1, ce1 and ce2 maybe correspond with high value but not correspond with ce3. In one such example, ce1 could represent a person "John" and the temporal context feature might by "at lunch time", ce2 represents "the nearest restaurant", and ce3 is "the nearest electronic store". At a different time t2 and location l2; ce1 may have a higher correspondence with ce3 than with ce2. Similarly at a time t3 and location l3, ce1, ce2 and ce3 all have the same correspondence value. An example may be where John would like to pick up a sandwich and then do some shopping before heading home.

In yet another example, given a person's contextual information such as time, location, user identity, and his/her mission in a battle space environment, multiple context-based entities about units (friendly or hostile), movements, activities, and damage assessment reports near the location may be linked and aggregated to further reveal opportunities, mitigate risk, and predict early warnings. The context of a context-based entity may change (e.g. used by different consumers, for different purposes, at different time/locations) and the set of its related context-based entities may thus change accordingly even though the data feature of the information object remains the same. CECM provides context aware information aggregation to identify, expose, derive, and manage meaningful relationships among context-based entities, to provide decision makers with a more comprehensive and integrated view of real-time battle space status, as well as to predict their future information needs.

Advantages of Context-Aware Entity Correspondence and Merge (CECM)

Existing approaches for information aggregation or information de-duplication have focused on the "static information value" only. However, if another dynamic aspect is introduced, that is, even if the information value remains the same, the merge or aggregation may generate different results because of the surrounding contextual information is different. A CECM system investigates the problem of correspondence entities based on contextual features of entities, semantic model and rules and then merges the entities based on user's policies or rules. This is sometimes referred to as context aware information aggregation.

The CECM solution addresses: a modular, flexible, extensible meta-model to represent, correlate, and transform data among different models and data instances, methods to dynamically link, group, aggregate, and merge contextually relevant context-based entity, and context-based entity automated meaning extraction, contextual correlation derivation, and predict future information needs by changing context.

CECM has some similarity to Entity Resolution (ER) but is fundamentally different. For example, where in ER there are two or more sources containing records representing same real-world entities (e.g., customers). However, the records representing the same entity may have differing information, e.g., one record may have the address misspelled, another record may be missing some fields. An entity resolution algorithm attempts to identify the matching records from multiple sources (i.e., those corresponding to the same real-world entity), and merges the matching records as best it can.

Context-Aware Model

Different types of context are represented by one or more models. For example, location context may be expressed as a geometric model representing location as an n-dimensional space and a symbolic model representing location using logical real-world entities such as buildings, streets, cities, or system-defined elements like economical zones. The choice of an appropriate context model may vary among different information providers and information consumers. A combined model provides easy correlation, conversion, and derivation between one and another. Context-aware entity correspondence and merge provides a context meta-model mechanism, which leverages many existing contextual ontologies (e.g. time, location, workflow, etc), with mappings and conversions represented by both ontological predicates and pluggable reasoning services. These services calculate information relationships (e.g. real-time spatial relationships such as distance/travel time between two units) and compose new information objects that merge multiple existing information objects together.

By binding temporal and contextual information relevancy, information regarding anticipated future context-based entity needs (e.g. future complex subscription) is developed. Predictive information management services leverage reasoning to infer information need, and when bound to Quality of Service services aware of temporal network and information resource topologies, the timeliness of relevant information while minimizing resource consumption is maximized.

Context-aware entity correspondence and merge relies on user-defined functions that (a) compare fields or records to determine if they match. Such matches can be deterministic and probabilistic or based on fuzzy logic matching algorithms. Context-aware entity correspondence and merge leverage from existing ER strategies and algorithms but incorporate more context features to enable dynamic ER according to ever changing surrounding environment.

In general, fuzzy logic resembles human reasoning in its use of approximate information and uncertainty to generate decisions. In relation to matching, the term is used loosely to describe the approach that relies on rules that are imprecise rather than precise and operates on data with boundaries that are not sharply defined.

Deterministic matching gives equal weight to the different types of information a record may contain. For example, a deterministic approach might place equal reliance on a match between the location names on two records or a match between two times.

Probabilistic matching exploits the statistical probability that a match on particular items is more or less likely to indicate that the records are match based on the existing context. For example, date information is subject to errors made by a mistake on a single digit, and the number of possible birth dates is relatively small. Names, in contrast, are more likely to be recognizable even if a single error is made. Probabilistic matching thus allows assigning appropriate weights to different attributes and then compares the total score to the threshold that defines a successful match.

To address the context-aware entity correspondence and merge, some of the techniques form entity resolution algorithms and utilize user-defined functions that (a) compare context features to determine if they match (but not represent the same real world entity), and (b) merge matching records.

A context-aware entity correspondence and merge solution correlates and aggregates multiple context-based entities based on their contextual correspondence, and therefore extends the one-dimensional (data feature only) information representation to a multi-dimensional (with various context features) information representation. As a result, context-aware entity correspondence and merge provides more options for decision makers to reduce information overload by filtering more relevant, precise, and ready to consume information from a large information space, tailored by, for example, an area of operation, a commander, a time period, and a given mission, each of which represents a specific context feature of the original information entity.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
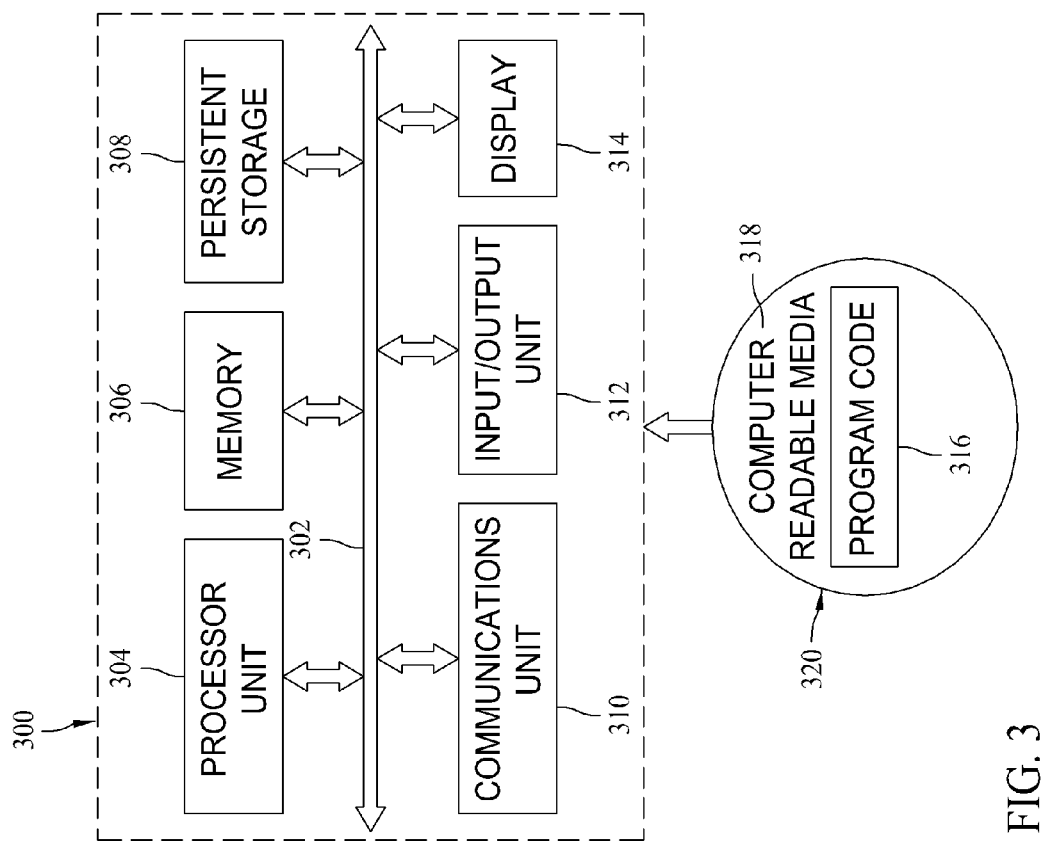
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

The data processing system 300 of FIG. 3 is but one example of a data processing system upon which the described embodiments may be executed. The methods described herein may be encoded as executable instructions embodied in a computer readable medium, including, without limitation, a storage device or a memory area of a computing device as described above. Such instructions, when executed by one or more processors, cause the processor(s) to perform at least a portion of the methods described herein. Also, and as utilized herein a "storage device" is understood to mean a tangible article, such as a hard drive, a solid state memory device, and/or an optical disk, that is operable to store data, such as computer-executable instructions.

Figure 4:
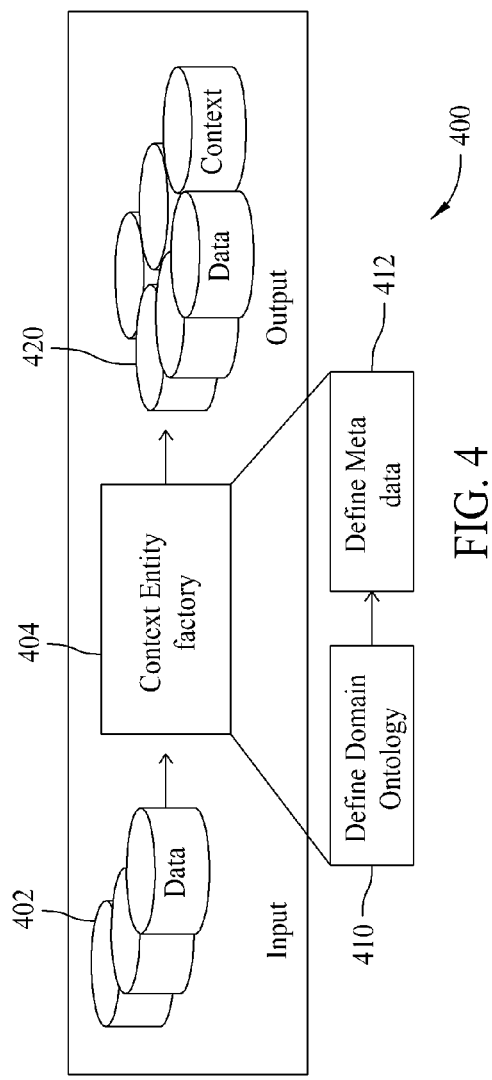
FIG. 4 is a depiction of a context-based entity factory process.

Turning now to FIG. 4, a context-based entity factory process 400 is depicted. Input data 402 is received by a context-based entity factory 404. Within factory 404, a domain ontology 410 is defined and meta data 412 are defined. Specifically, with respect to domain ontology 410, the ontology is analyzed and defined and a context aware model is modified. With respect to meta data 412, the meta data is analyzed and defined about data content and context and stored in a repository, such that the context-based entity factory 404 can provide context and time relevant data 420 as an output.

In the context-based entity factory process 400 an extensible context modeling mechanism is developed that can incorporate, correlate and transform dynamic contextual facts, such as temporal-spatial characteristics, as well as task-relevant information, among different models and data instances. Different types of context are represented by one or more models, for example, by ontologies and/or lower-level data structures/models. The choice of an appropriate context model may vary among information providers/consumers. Therefore a combined model management mechanism is provided with easy correlation, conversion, and derivation between one and another.

More specifically, a context meta-model mechanism is included that works with existing contextual ontologies (e.g. time, location, mission planning, etc) and provides mapping among one and another. A generic context model management/mapping formalism is provided for importing the existing models, and enriched semantic understanding of contextual content, enable contextual alignments, and perform progressive amendment in response to the dynamically changing environment.

The meaning of various contextual data is usually hidden or highly embedded in various data systems, creating one of the major barriers for a truly shared understanding among information consumers. To address such a shortcoming, ontologies and algorithms are utilized to enrich the semantics of contextual content, by means of tagging data models and data instances with context ontologies. The tagging and mapping mechanism also provides varying degrees of domain-customized generality (e.g. conceptual grouping) and specialization (e.g. approximation via uncertainty) to deal with the dynamically changing information space.

The "noisy" factor of original data entry, such as errors, duplicates, and missing values (e.g. sensor readings) may invalidate existing contextual mappings and further cause failure of reasoning engine to derive secondary context. New information sources may also join constantly, and the new data may not fit well with existing mappings. Conditional contextual alignments, uncertainties of contextual similarity and correspondence, as well as developing merging and consistency checking axioms for real-time alignment, validation and progressive amendment in response to changes and exceptions are incorporated. In addition, semantic rules are utilized to compose/decompose existing alignments within a hierarchical structure, as well as append/relax alignment conditions and/or confidence levels for approximations, to greatly increase the adaptability and reliability of context data management and dissemination in dynamic environments.

The information producers/consumers roles vary greatly under various circumstances and contexts. Each agent takes a role in handling the context where importance is indicated by the priority. The extensible context model also applies "user-centric" confidence values (i.e. depicting the relevancy to a particular task/mission) to low-level contextual facts, which can be propagated to high-level contextual information according to the specific roles that different information producers/consumers are playing in order to improve the effectiveness and efficiency of contextual reasoning capability as detailed herein.

Figure 5:
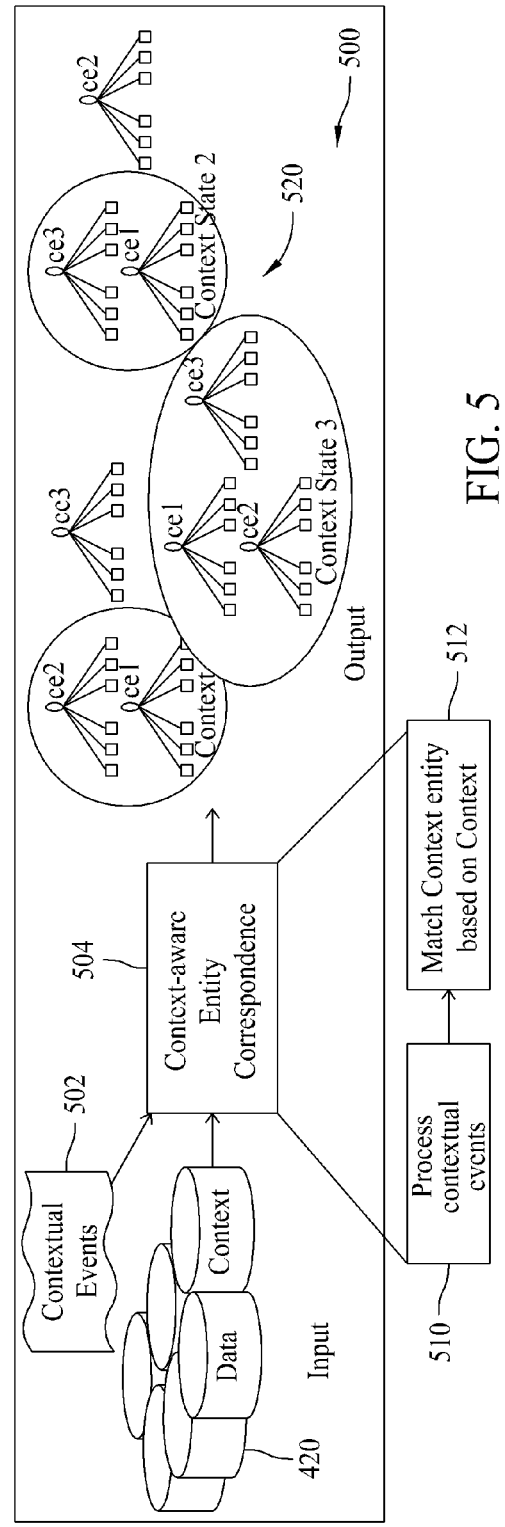
FIG. 5 is a depiction of a context-aware entity correspondence process.

In FIG. 5, the context and time relevant data 420 of FIG. 4 is utilized as an input into a context-aware entity correspondence process 500. In addition to the context and time relevant data 420, contextual events 502 are input into a context-aware entity correspondence engine 504. Within the engine 504, contextual events are processed 510, to determine contextual matters such as time, location, identity, tasks, and any application specific context. The processed 510 events meta data are matched 512 with context-based entity meta data based on context. The meta data is analyzed and defined about data content and context and stored in a repository, such that the context-aware entity correspondence engine 504 can provide, as output 520, context based data features and context based context features.

Process 500 receives context data based on a context definition, including one or more data types and one or more parameters for each data type based on entity properties, entity positions, and entity types. Data for output 520 is formatted for an entity separately from context data.

One goal is to develop a reasoning capability to infer higher-level knowledge (e.g. values, implications, 'what if changed' assumptions, hypotheses, etc.) about context from lower-level contextual properties, which can be derived from available data or low-level information sources (e.g. sensors) distributed across the network. In heterogeneous and dynamic application domain, effective context modeling and reasoning are important if implicit contexts are to be represented to enable distributed reasoning, decision making and collaboration. For example, when mission planning artifacts are bound by temporal constraints (e.g. make a decision within 15 minutes) and an information resource limit (e.g. UAV route and camera settings to derive UAV coverage) effective context modeling and reasoning can maximize the timeliness of decision making while minimizing resource consumption.

The effectiveness of existing approaches for distributed reasoning significantly degrades when scale goes up. To address, a layered context model is utilized, in which higher-level context models can be inferred from lower-level context models, as well as distributed reasoning based on priority. The layered context modeling is based on multidimensional space. In the lowest layer, a context model is inferred from the original context information, while in higher layers, the context model is inferred from the adjacent lower layer, without using the original context information. The reasoning does not involve all the agents' perspectives, but only the highly relevant ones based on priority. Considered is the circumstance where there exists some differences in the roles of the agents. If the priority of an agent is low, its contribution in the merged model will be small and less resource will be spent on updating its context information. Therefore, the approaches described herein decrease the amount of network traffic the system needs to process. Furthermore, this approach makes the system more stable and flexible in context adaptation.

The "user-centric" confidence values can increase the trust and stability of distributed reasoning within merged context models. If the priority of an agent is low based on its confidence value, less resource is used for updating its information. Furthermore, only when agents' contributions are greater than certain thresholds (i.e. derived from a predictive model of decision making and behavioral analysis), information will be processed to improve the resource optimization in distributed reasoning. Hence, minimizing the resources used to update agents' context information, making context adaptation more stable and flexible, especially in a competing and resource constrained networked environment.

Figure 6:
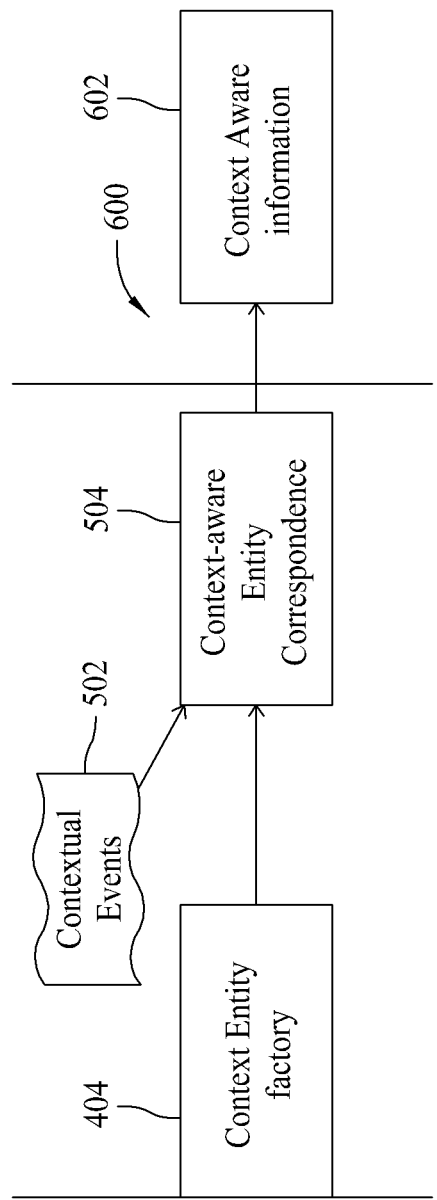
FIG. 6 is a flow diagram illustrating the combination of the context-based entity factory process of FIG. 4 and the context-aware entity correspondence process of FIG. 5.

FIG. 6 is a flow diagram 600 illustrating the combination of the context-based entity factory process 400 and the context-aware entity correspondence process 500. Specifically output of the context entity factory 404 and contextual events 502 are combined within the context-aware entity correspondence engine 504, which provides context based data features and context based context features, collectively referred to as context aware information 602.

The CECM embodiments described herein address a modular, flexible, and extensible meta-model to represent, correlate, and transform data among different models and data instances. Further, methods to dynamically link, group, aggregate, and merge contextually relevant context-based entities are provided as are automated meaning extraction, contextual correlation derivation, and prediction of future information needs by changing of context.

The embodiments address known problems related to the correlation of relevant information from multiple sources based on the contextual correspondence of multiple information entities so as to link and/or merge those entities together to better meet total information needs in specific situations.

In summary, the CECM solution described herein correlates and aggregates multiple context-based entities based on their contextual correspondence, and therefore extends the one-dimensional (data feature only) information representation to a multi-dimensional (with various context features) information representation. As a result, more options for decision makers to reduce information overload by filtering more relevant, precise, and ready to consume information from a large information space, tailored by, for example, an area of operation, a commander, a time period, and a given mission, each of which represents a specific context feature of the original information entity.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for correlating relevant information from multiple entities based on contextual correspondence, said method comprising:

receiving, at a computer, information relating to a plurality of the multiple entities, the information including data features and context features;

correlating the data features utilizing one or more algorithms running on the computer;

correlating the context features utilizing the one or more algorithms running on the computer;

aggregating the plurality of the multiple entities based on a correspondence of the data features, a correspondence of the context features, and at least one context model for at least one of storage in a memory associated with the computer and output as data from the computer, wherein the at least one context model includes temporal information associated with the context features;

receiving a first contextual event including temporal information at a first location associated with the first contextual event;

receiving a second contextual event including temporal information at a second location associated with the second contextual event, wherein the first contextual event is different from the second contextual event and the first location is different from the second location;

matching a plurality of entities based on the received contextual events;

determining a correspondence value for the matched plurality of entities based on a comparison of at least one of the data features or context features in light of the temporal information of the first contextual event and the first location;

dynamically updating the correspondence value for the matched plurality of entities based on a comparison of at least one of the data features or context features in light of the temporal information of the second contextual event and the second location; and outputting the matched plurality of entities that exceed a predetermined correspondence value.

2. The method according to claim 1 further comprising storing the context features associated with an entity in a repository.

3. The method according to claim 1 wherein correlating the context features comprises correlating context features that are dynamic over time.

4. The method according to claim 1 wherein aggregating the plurality of the multiple entities comprises filtering the correlated context features to provide relevant information to an information consumer.

5. The method according to claim 1 wherein correlating the context features comprises correlating the context features based on a specific purpose defined by an information consumer.

6. The method according to claim 5 further comprising using changing contextual correlations to predict future information needs for the information consumer.

7. The method according to claim 1 wherein correlating the context features comprises correlating the context features to identify and manage relationship among the plurality of the multiple entities.

8. The method according to claim 1 wherein correlating the context features comprises leveraging existing contextual ontologies with mappings and conversions represented by both ontological predicates and pluggable reasoning services.

9. The method according to claim 1 wherein aggregating the plurality of the multiple entities comprises calculating information relationships and composing information objects that merge the received information.

10. The method according to claim 1 wherein aggregating the plurality of the multiple entities comprises binding temporal and contextual information relevancy and any information regarding anticipated future context-based entity needs.

11. The method according to claim 1 wherein correlating the context features comprises using at least one of deterministic, probabilistic, and fuzzy logic matching algorithms to correlate the context features.

12. The method according to claim 1 wherein correlating the context features further comprises:

utilizing ontologies and algorithms to enrich the semantics of contextual content by tagging data models and data instances with context ontologies; and providing varying degrees of domain-customized generality and specialization to address dynamically changing information space.

13. The method according to claim 1 wherein correlating the context features further comprises:

using semantic rules to compose and decompose existing alignments within a hierarchical structure; and using semantic rules to append and relax at least one of alignment conditions and confidence levels for approximations, such that the adaptability and reliability of context data management and dissemination in dynamic environments is increased.

14. One or more computer-readable storage media having computer-executable instructions embodied thereon, wherein when executed by at least one processor, the computer-executable instructions cause the at least one processor to:

receive information relating to a plurality of the entities, the information including data features and context features;

separately correlate the data features and the context features;

aggregate the plurality of entities based on a correspondence of the data features, a correspondence of the context features, and at least one context model that includes temporal information associated with the context features;

receive a first contextual event including temporal information, wherein the first contextual event is associated with a first location;

receive a second contextual event including temporal information, wherein the second contextual event is different from the first contextual event, and the second contextual event is associated with a second location different from the first location;

match a plurality of entities based on the received contextual events;

determine a correspondence value for the matched plurality of entities based on a comparison of at least one of the data features or context features in light of the temporal information of the first contextual event and the first location;

dynamically update a correspondence value for the matched plurality of entities based on a comparison of at least one of the data features or context features in light of the temporal information of the second contextual event and the second location; and output the matched plurality of entities that exceed a predetermined correspondence value.

15. One or more computer-readable storage media according to claim 14 wherein the computer-executable instructions cause the at least one processor to leverage existing contextual ontologies with mappings and conversions represented by both ontological predicates and pluggable reasoning services to correlate the contextual features.

16. One or more computer-readable storage media according to claim 14 wherein the computer-executable instructions cause the at least one processor to use at least one of deterministic, probabilistic, and fuzzy logic matching algorithms to correlate the context features.

17. One or more computer-readable storage media according to claim 14 wherein the computer-executable instructions cause the at least one processor to correlate the context features such that relationships among the plurality of entities are identified and managed.

* * * * *